(No Model.) 2 Sheets—Sheet 2.
H. LOEWENSTEIN
CULTIVATOR.
No. 418,953. Patented Jan. 7, 1890.
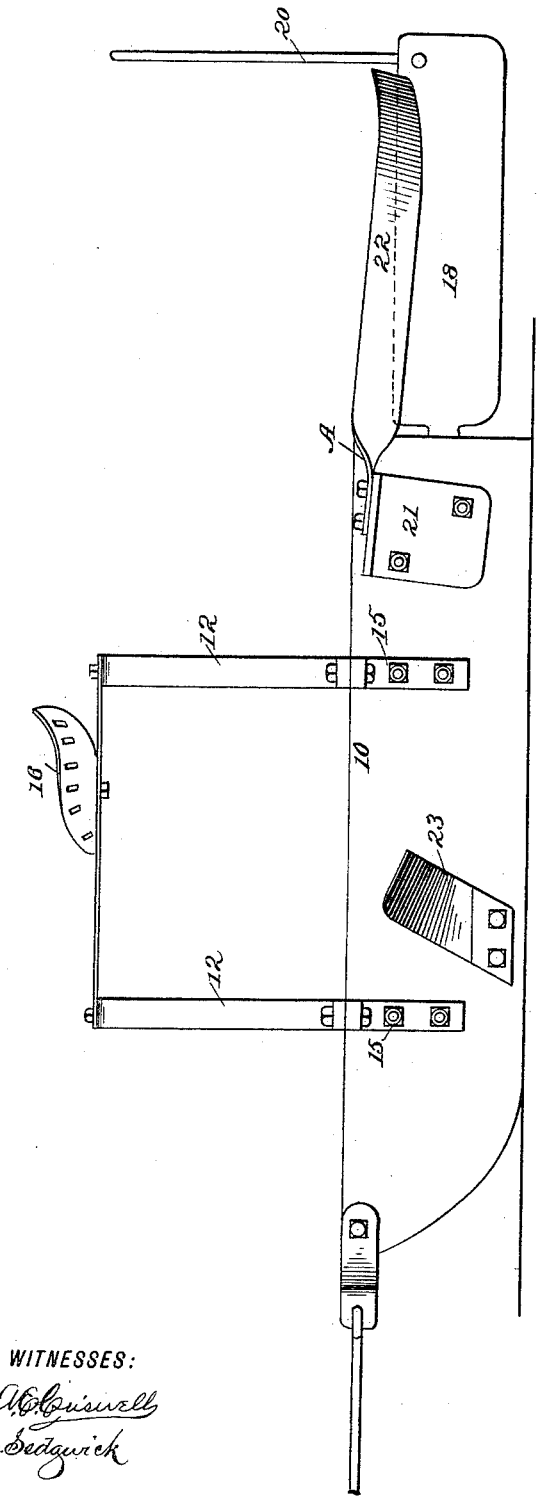
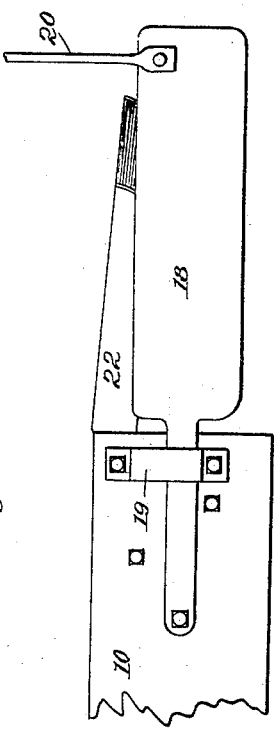
WITNESSES:
INVENTOR:
H. Loewenstein
BY Munn & Co.
ATTORNEYS.

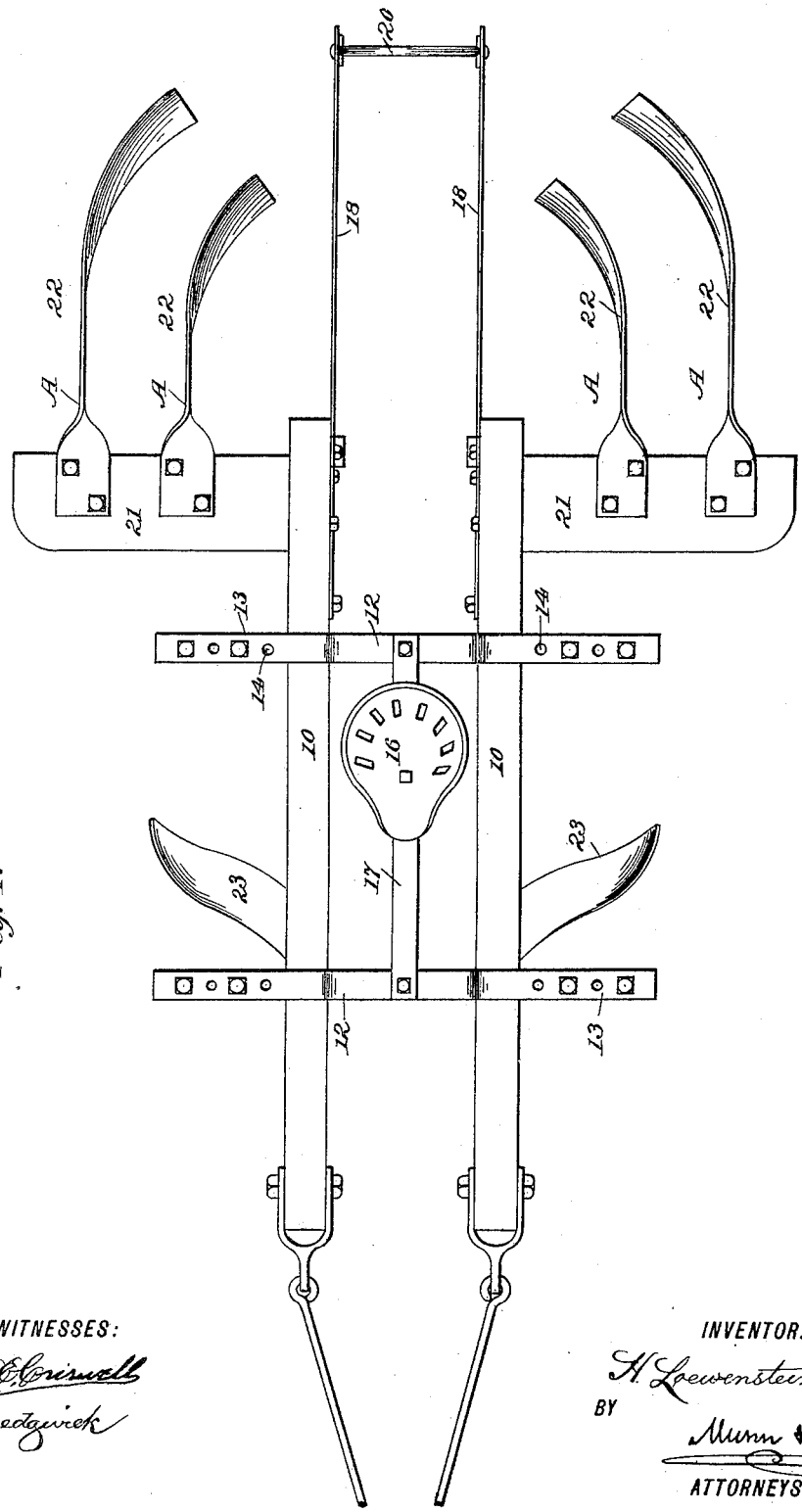

UNITED STATES PATENT OFFICE.

HENRY LOEWENSTEIN, OF KEARNEY, NEBRASKA.

CULTIVATOR.

SPECIFICATION forming part of Letters Patent No. 418,953, dated January 7, 1890.

Application filed August 2, 1889. Serial No. 319,501. (No model.)

*To all whom it may concern:*

Be it known that I, HENRY LOEWENSTEIN, of Kearney, in the county of Buffalo and State of Nebraska, have invented a new and useful Improvement in Cultivators, of which the following is a full, clear, and exact description.

My invention relates to an improvement in cultivators especially adapted for use in cultivating listed corn, and has for its object to provide an implement of this character of simple and durable construction, and capable of being adjusted to properly cultivate the corn when very young and in various stages of its growth.

The invention consists in the novel construction and combination of the several parts, as will be hereinafter fully set forth, and pointed out in the claims.

Reference is to be had to the accompanying drawings, forming a part of this specification, in which similar letters and figures of reference indicate corresponding parts in all the views.

Figure 1 is a plan view of the cultivator. Fig. 2 is a side elevation; and Fig. 3 is a partial side view of one of the runners, illustrating the attachment thereto of the fender.

The body of the cultivator consists of two spaced parallel runners 10, united by a series of metal arches 12, which arches are provided with outwardly-extending flanges 13, integral with the extremities of their members, which flanges are provided with a series of apertures 14. The arches are attached to the runners by connecting the flanges with angled brackets 15, securely bolted to the outer faces of the runners, as illustrated in Fig. 2, the flanges and the horizontal members of the brackets being securely bolted together or attached in an equivalent manner. Besides the series of apertures 14 produced in the flanges of the arches, a corresponding series of apertures are produced in the horizontal members of the brackets, in order that the space between the runners may be increased or decreased, as the character of the work may demand.

The seat 16 is usually attached to a longitudinal bar 17, which bar is secured to two of the arches, as shown in Figs. 1 and 2.

Upon the inner face of each of the runners 10 the inner reduced end of a fender 18 is secured by being bolted at its reduced extremity to the runners, as shown in Fig. 3, the upward and downward adjustment of the fenders being limited by a strap 19, passed over the reduced end and secured to the runners, as is also illustrated in the same figure. In order to keep the fenders a certain distance apart, and to raise and lower the same when occasion may demand, the opposed fenders are united at or near their outer ends by an arch 20.

Near the rear end of each runner 10 an angle-arm 21 is bolted to the outer face of the runners, the horizontal members of which arms are longer than the vertical members. Upon the horizontal members of the arms 21 two or more blades 22 are securely bolted, which blades have their sides bolted to the arms and are twisted at or near the arms in such manner that their lower edges will be presented to the ground, as shown at A in Figs. 1 and 2. The rear extremities of the said blades are curved inward in the direction of the fenders in such manner that the inner faces will be more or less beveled or inclined downward, whereby the said extremities of the blades form substantially a scoop with which to throw the earth against the roots of the corn.

At or near the forward end of each of the runners 10 a cutter 23 is rigidly secured to the outer face slightly above the lower edge. These cutters 23 extend rearward at an angle to the runners, and to each cutter an essentially-spiral twist is imparted, whereby the side edges are in the direction of the front and rear, while the faces of the cutters are in a condition to free themselves quickly from the earth that may be brought in contact therewith.

When the corn is quite young and cultivated for the first time, the arms 21 of the cultivator, carrying the teeth or blades 22, are placed in the position illustrated in the drawings—namely, with the horizontal members near the upper edge of the runners. When the ridges have become worked down and the furrows are smaller, the runners are set closer together by removing the bolts and passing them through the inner apertures 14 of the flanges of the arches and the brackets 15.

The arms 21 are also reversed to bring the horizontal members near the base of the runners. This is effected by placing the right-hand arm upon the left side, and vice versa. The knives always remain upon the side illustrated in the drawings. This change is not made until the corn has grown tall enough to dispense with the fenders 18. The arch secured to the fenders is intended to prevent them from crowding too close to the corn while being cultivated, and to enable the driver to raise the fenders when it is necessary to turn the implement.

The cutters 23, secured to the sides of the runners, are adapted to pulverize the ground before the blades contact therewith to throw the earth upon the roots of the corn.

Having thus described my invention, I claim as new and desire to secure by Letters Patent—

1. A cultivator comprising the parallel runners, the arms 21, projecting from said runners near their rear ends, the blades 22, twisted axially at their inner ends, as at A, and bolted to the arms 21, the rear ends of the blades being curved inwardly and upwardly, and the cutters 23, bolted to the outer sides of the runners near their forward ends and inclined outwardly and rearwardly, the fenders 18, pivoted at their inner ends to the runners and extending rearwardly between the blades 22, and a stop 19, for limiting the vertical movement thereof, substantially as set forth.

2. A cultivator comprising the runners 10, having angle-brackets 15 15 secured to their outer faces, the horizontal arms thereof being vertically apertured, the arches 12, having horizontal arms 13 at their lower ends, provided with vertical apertures, bolts 15, connecting said horizontal arms and permitting of adjusting the space between the runners, a bar 17, connecting the arches and provided with a seat, the angle-arms 21, bolted to the sides of the runners near their rear ends, the blades 22, bolted at their flat inner ends to the flat faces of the horizontal members of the arms 21, twisted axially, as at A, and curved inwardly and upwardly at their rear ends, and the fenders 18, substantially as set forth.

3. In a cultivator, the combination, with parallel runners, brackets secured to the outer face of the runners, arches adjustably secured to the said brackets, and a detachable and reversible arm projected at a right angle from the outer side of each runner at the rear, of blades secured to the said arms, twisted near their intersection with the arms, whereby their lower edge is presented to the soil, the said blades also having their rear extremities inwardly curved and slightly inclined, fenders detachably and adjustably secured to the said runners, and a cutter attached to the outer face of each runner near the forward end, which cutters are formed with an essentially-spiral twist, substantially as and for the purpose specified.

HENRY LOEWENSTEIN.

Witnesses:
GEORGE H. CORNELL,
HUBERT C. KERMANN.